United States Patent Office

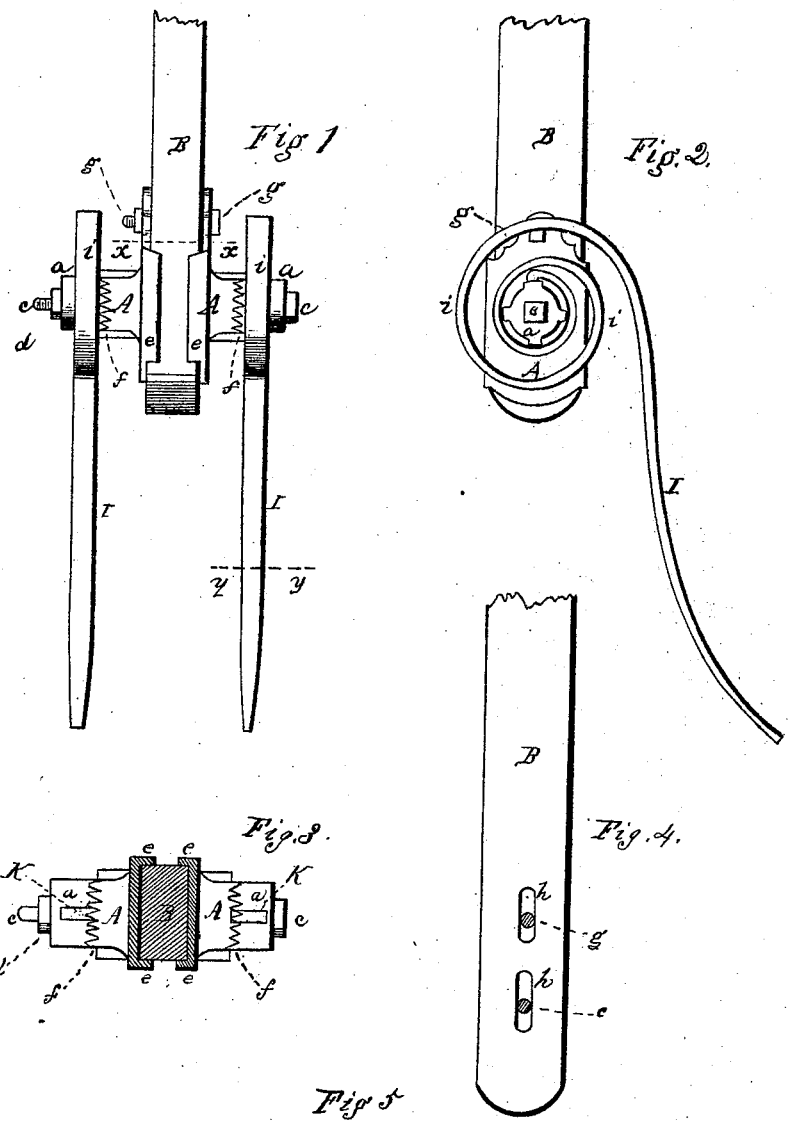

GEORGE A. SQUIER, OF SYRACUSE, NEW YORK.

Letters Patent No. 76,952, dated April 21, 1868.

IMPROVEMENT IN TEETH FOR HAY-SPREADERS.

*The Schedule referred to in these Letters Patent and making part of the same.*

TO ALL WHOM IT MAY CONCERN:

Be it known that I, GEORGE A. SQUIER, of Syracuse, in the county of Onondaga, and State of New York, have invented a new and improved Hay-Tedder Fork; and I do hereby declare that the following is a full, clear, and exact description thereof, which will enable those skilled in the art to make and use the same, reference being had to the accompanying drawings, forming part of this specification, in which—

Figure 1 is a rear view of my invention, and

Figure 2 is a side view of the same.

Figure 3 is a horizontal section, taken in the line $x\ x$ in fig. 1.

Figure 4 is a detail view.

Figure 5 shows a cross-section of a fork-tine, taken in the line $y\ y$ in fig. 1.

Similar letters of reference indicate corresponding parts in all the figures.

This invention relates to certain new and useful improvements in the tedder-forks of Patent No. 32,350, whereby a more efficient fork is obtained, as hereinafter described.

I construct the head of my fork by bolting a metallic ear, A, fig. 1, to each side of the fork-handle or "kicker," B. Each ear is made in two parts, A $a$, and fitted together with a serrated joint, $f$. When the parts are placed on the handle B, a screw-bolt, $c$, is passed through the centre of the whole, and, with a nut, $d$, secures them firmly in position. An additional screw-bolt, $g$, is passed through the handle and the upward extensions of A A. Each ear has also a pair of flanges, $e\ e$, which embrace the front and rear sides of the handle, and aid in securing the ears thereto.

The outer parts, $a$, of the ears have slots $k$, fig. 3, for holding the tines I. The securing-bolts $c\ g$ pass through slots $h\ h$, in the handle B, fig. 4, so that the fork-head is adjustable longitudinally on the handle.

The tines I are of a flat form, as shown by cross-section, fig. 5, and are coiled around the head of the fork in a volute manner, or in a coil like that of a watch-spring.

The advantage of the volute form of the coil is that the fork has a greater upward elasticity when it strikes uneven ground or other obstructions, and yields upward through a much greater range than heretofore, and, by making the tines of a flat form, they yield more readily and evenly to a sudden strain, in line of the vehicle's motion, when they catch on the ground; and by this construction of tines the fork can be worked close to the ground without injury to the fork.

The serrated joints $f\ f$, in the head of the fork, allow the points of the tines to be adjusted to the proper position again, if any of them should get sprung a little out of place at any time. This is done by slackening the bolt $c$, so that the serrated joint is disengaged, and then the tine being turned into its proper place, the bolt is again tightened up, and the joint $f$ is engaged in a new position.

By these means I obtain a machine-tedder fork, which is much more reliable and efficient in its action than heretofore.

Having thus described my invention, what I claim as new, and desire to secure by Letters Patent, is—

The fork-head A, made in sections A $a$, for securing the tines, and having serrated joints $f$, as herein shown, and for the purpose described.

GEORGE A. SQUIER.

Witnesses:
 A. P. BROWN,
 F. A. MORLEY.